(12) United States Patent
Hong et al.

(10) Patent No.: US 7,842,414 B2
(45) Date of Patent: Nov. 30, 2010

(54) LITHIUM SECONDARY BATTERY

(75) Inventors: Seung-Joon Hong, Yongin-si (KR);
Seok-Gyun Chang, Yongin-si (KR);
Jung-Seog Kim, Yongin-si (KR);
Sang-Bong Nam, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1006 days.

(21) Appl. No.: 11/646,490

(22) Filed: Dec. 28, 2006

(65) Prior Publication Data
US 2007/0154788 A1    Jul. 5, 2007

(30) Foreign Application Priority Data
Dec. 29, 2005    (KR) .................. 10-2005-0134541

(51) Int. Cl.
*H01M 2/00*    (2006.01)
(52) U.S. Cl. .................. 429/163; 429/185; 429/171; 429/176; 429/234; 429/247; 429/129
(58) Field of Classification Search .................. 429/163, 429/185, 171, 176, 234, 247, 129
See application file for complete search history.

(56) References Cited

U.S. PATENT DOCUMENTS

| 6,669,860 | B1 | 12/2003 | Maruyama | |
| 2005/0089759 | A1* | 4/2005 | Hwang et al. | 429/234 |

FOREIGN PATENT DOCUMENTS

| JP | 9-274920 | 10/1997 |
| KR | 2000-0075765 | 12/2000 |

* cited by examiner

*Primary Examiner*—Laura S Weiner
(74) *Attorney, Agent, or Firm*—Robert E. Bushnell, Esq.

(57) ABSTRACT

A lithium secondary battery, and more particularly, a lithium secondary battery which can improve the impregnation of an electrolyte solution either by modifying the material of a protection layer, such as a laminating tape and others, to be formed to protect the elimination of active materials, into a material with an affinity for the electrolyte solution, or by coating the material of an existing protection layer with an ingredient with an affinity for the electrolyte solution.

15 Claims, 5 Drawing Sheets

LITHIUM SECONDARY BATTERY

CLAIM FOR PRIORITY

This application makes reference to, incorporates the same herein, and claims all benefits accruing under 35 U.S.C. §119 from an application for LITHIUM SECONDARY BATTERY earlier filed in the Korean Intellectual Property Office on 29 Dec. 2005 and there duly assigned Serial No. 10-2005-0134541.

BACKGROUND OF THE INVENTION

1. Field of the Invention

The present invention relates to a lithium secondary battery, and more particularly, to a lithium secondary battery, which can improve the impregnation of an electrolyte solution either by modifying the material of a protection layer, such as a laminating tape and others, to be formed to protect the elimination of active materials, into a material with an affinity for the electrolyte solution, or by coating the material of an existing protection layer with an ingredient with an affinity for the electrolyte solution.

2. Description of the Related Art

Generally, in accordance with the weight-reduction and high performance of wireless portable devices, such as a camcorder, a cellular phone, a notebook computer and others, there are many studies on the secondary battery used as the power supply therefor. Such secondary battery includes nickel-cadmium battery, nickel-hydrogen battery, nickel-zinc battery, lithium secondary battery and others. Among them, the lithium secondary battery can be recharged and is capable of realizing a size-reduction which providing an increase in capacity. Since the lithium secondary battery has a high operating voltage and a high energy density per unit weight, it is advantageous to be used broadly in high-tech electronics.

In detail, lithium is frequently used as a material for the secondary battery, and has a low atomic weight. Therefore, lithium is a suitable material for the fabrication of a battery with a high energy capacity per unit weight. Meanwhile, lithium reacts violently with water; therefore a non-aqueous electrolyte is used in a lithium-based secondary battery. In this case, since the lithium-based secondary battery is not affected by a decomposition voltage of an electrolysis involving water, it is advantageous to generate an electromotive force (EMF) of approximately 3V to 4V.

The non-aqueous electrolyte used in the lithium secondary battery includes a liquid electrolyte in which a lithium salt is dissociated in an organic solvent, and a solid electrolyte. The organic solvent may include ethylene carbonate, propylene carbonate or carbonate containing other alkyl group or analogous organic compounds.

Such lithium secondary battery mainly uses a lithium-based oxide as a cathode active material and a carbon material as an anode active material. Generally, the lithium secondary battery is classified, based on the kind of electrolytes used therein, into a lithium ion secondary battery using a liquid electrolyte, and a lithium polymer secondary battery using a polymer electrolyte. Further, the lithium secondary battery has been fabricated into various shapes such as a cylindrical shape, a polygon shape and a pouch shape.

Generally, the lithium secondary battery is constructed with an electrode assembly in which a cathode plate coated with a cathode active material, an anode plate coated with an anode active material, and a separator interposed between the cathode and anode plates to prevent the electrical short-circuiting and to enable only the movement of a lithium ion (Li-ion), are wound together, a case for accommodating the electrode assembly, and an electrolyte solution injected into the inside of the case and enabling the movement of a Li-ion, and others.

Such lithium secondary battery is fabricated as follows.

Firstly, the electrode assembly is prepared by laminating the cathode plate coated with the cathode active material and attached with a cathode tab, the anode plate coated with the anode active material and attached with an anode tab, and the separator, and subsequently winding them together. Then, the electrode assembly is accommodated in the case to prevent the separation thereof. Finally, a cylinder-shaped lithium secondary battery is constructed by injecting an electrolyte solution into the case and then sealing the case, while a polygon-shaped lithium secondary battery is constructed by sealing the case with a cap assembly and then injecting the electrolyte solution into the case.

The cathode and anode plates include an active material portion in which an electrode collector is coated with electrode active materials and an electrode uncoated portion composed only of the electrode collector. The adjoining portion between the active material portion and the electrode uncoated portion features a low adhesive force between the active materials and the electrode collector and there is a possibility that the active materials are eliminated, peeled-off or removed from the electrode plate. The elimination of the active materials causes damage on the separator, so that internal short-circuiting may occur. Accordingly, in order to prevent the elimination of the active materials, a laminating tape is attached to the adjoining portion between the active material portion and electrode uncoated portion.

The laminating tape, however, is made from a material that does not have an affinity for the electrolyte solution, and thus the laminating tape can not be sufficiently wetted by the electrolyte solution and enough impregnation of the electrolyte solution is interrupted. Further, in accordance with high capacity battery pack, the interior of the electrode assembly has high density, and it is thus more difficult to become impregnated by the electrolyte solution. Accordingly, there is a need either to modify the material of the laminating tape attached to the interior of the electrode assembly into a material with an affinity for the electrolyte solution, or to coat the interior of the electrode assembly with a material with an affinity for the electrolyte solution, in order to improve the impregnation of the electrolyte solution.

SUMMARY OF THE INVENTION

It is therefore an object of the present invention to provide an improved lithium secondary battery.

It is another object to provide a lithium secondary battery that can improve the impregnation of an electrolyte solution either by forming a material with an affinity for the electrolyte solution into a protection layer, such as a laminating tape and others, in order to prevent active materials from being eliminated from electrode plates, or by coating the electrolyte solution with a material with an affinity for the electrolyte solution.

Additional advantages, objects and features of the invention will be set forth in part in the description which follows and in part will become apparent to those having ordinary skill in the art upon examination of the following or may be learned from practice of the invention.

According to an aspect of the present invention, there is provided a lithium secondary battery constructed with an electrode assembly, a case for receiving the electrode assembly and an electrolyte solution, and a cap assembly for sealing an upper opening of the case. The electrode assembly is constructed with a cathode plate having a cathode active material portion in which a cathode collector is coated with a cathode active material and a uncoated cathode portion composed only of the cathode collector, an anode plate having an anode active material portion in which an anode collector is coated with an anode active material and an anode uncoated portion composed only of the anode collector, a protection layer formed on an adjoining portion between the active material portion and the electrode uncoated portion, and a separator that is interposed between the cathode and anode plates. The material of the protection layer has an affinity for the electrolyte solution due to a wettability and a dispersibility of the material against an electrolyte solution.

The material with an affinity for the electrolyte solution may be a polymer, preferably, polyvinylidene fluoride (PVdF). In this case, the polyvinylidene fluoride is preferably one of PVdF 761, PVdF 2801 or a mixture of PVdF 761 and PVdF 2801.

The polymer may include one of ester group, hydroxy group and carboxylic group. Further, the material with an affinity for the electrolyte solution may be a surfactant. In this case, the surfactant may be BRIJ®.

The protection layer may have a plurality of holes. In this time, the holes may be formed into one shape selected from circle, triangle and square.

The protection layer may have insulation property.

The protection layer may be a laminating tape to be attached to the adjoining portion between the active material portion and the electrode uncoated portion.

The protection layer may be a coating layer to be applied to the adjoining portion between the active material portion and the electrode uncoated portion.

According to another aspect of the present invention, there is provided a lithium secondary battery constructed with an electrode assembly, a case for receiving the electrode assembly and an electrolyte solution, and a cap assembly for sealing an upper opening of the case. The electrode assembly is constructed with a cathode plate having a cathode active material portion in which a cathode collector is coated with a cathode active material and a uncoated cathode portion composed only of the cathode collector, an anode plate having an anode active material portion in which an anode collector is coated with an anode active material and an anode uncoated portion composed only of the anode collector, a protection layer that is formed on an adjoining portion between the active material portion and the electrode uncoated portion, and a separator that is interposed between the cathode and anode plates. The protection layer is constructed with a laminating tape to be attached to the adjoining portion between the active material portion and the electrode uncoated portion, and a coating film that is made from a material with an affinity for the electrolyte solution due to a wettability and a dispersibility of the material against an electrolyte solution and that is applied to the surface of the laminating tape.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
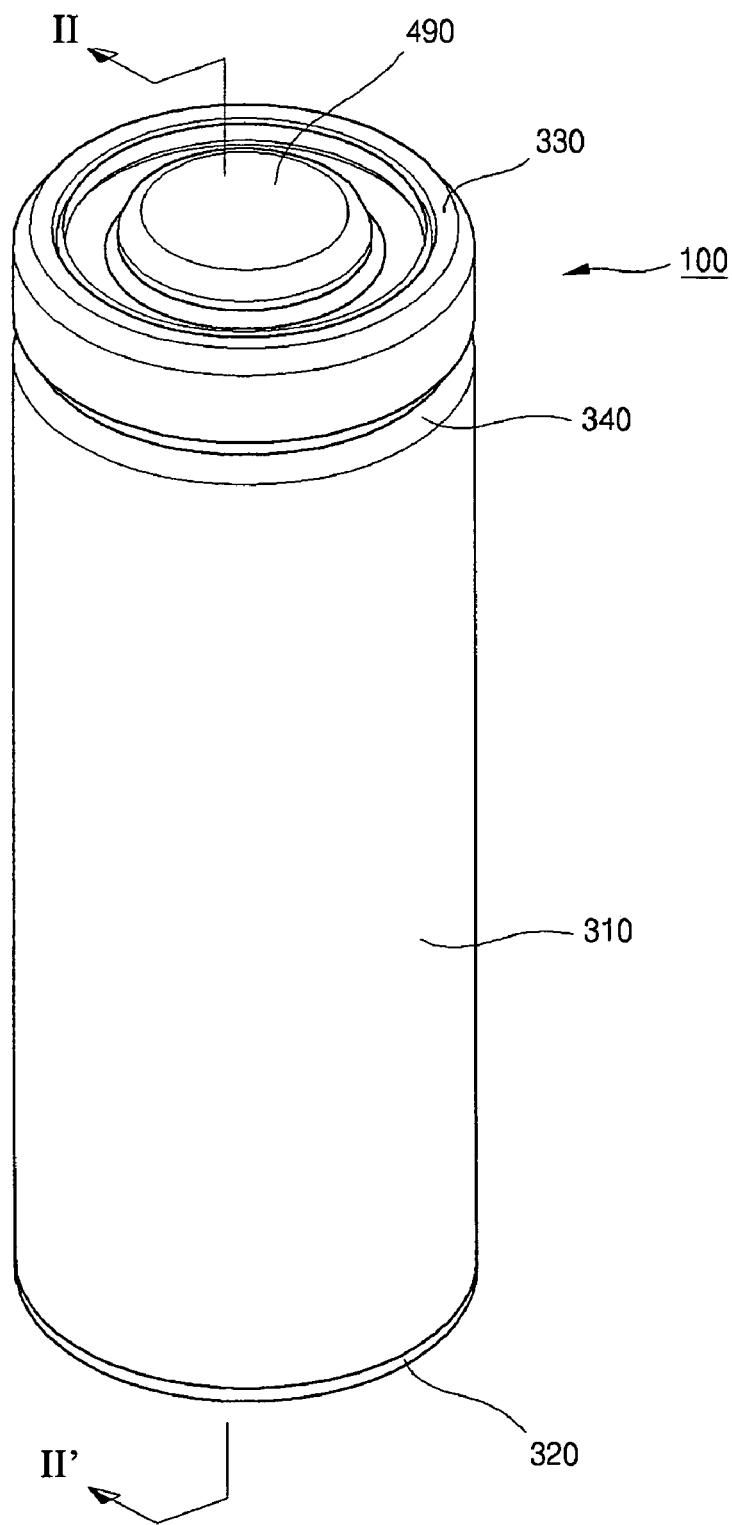
FIG. 1 is a perspective view illustrating a lithium secondary battery constructed as one exemplary embodiment of the principles of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. The present invention, however, is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
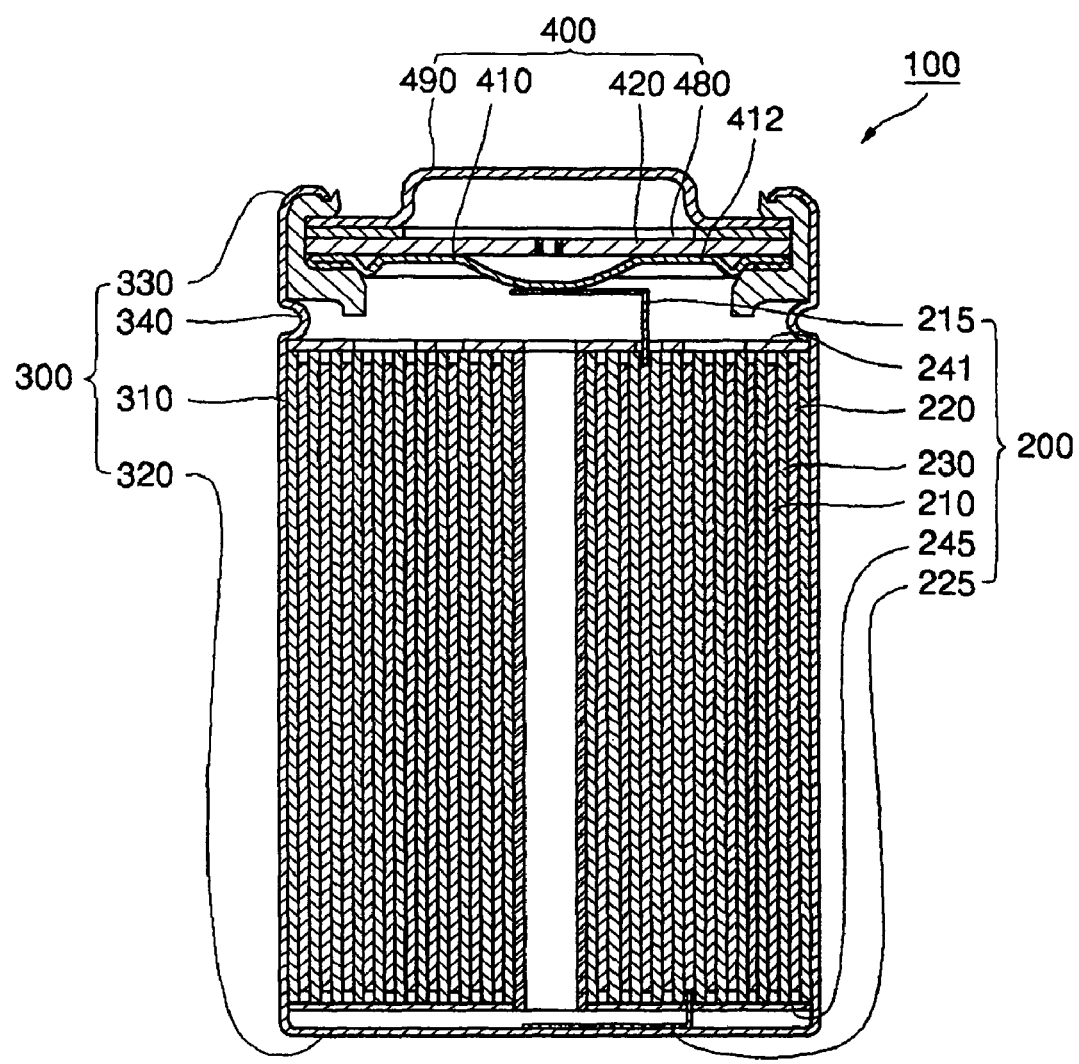
FIG. 2 is a cross-sectional view taken along the line II-II' in FIG. 1.

FIG. 1 is a perspective view illustrating a lithium secondary battery constructed as one embodiment of the principles of the present invention, and FIG. 2 is a cross-sectional view taken along line II-II' in FIG, provided that the lithium secondary battery has a cylinder shape for convenience. The present invention, however, can apply to a polygon- or pouch-shaped lithium secondary battery.

Referring to FIGS. 1 and 2, the cylinder-shaped lithium secondary battery 100 is constructed with an electrode assembly 200, a cylinder-shaped can 300 (i.e., a case) for accommodating electrode assembly 200 and an electrolyte solution (not shown), and a cap assembly 400 mounted on the top of cylinder-shaped can 300 for sealing cylinder-shaped can 300 and transferring a flow of electricity generated in electrode assembly 200 to an external device (not shown).

Figure 3:
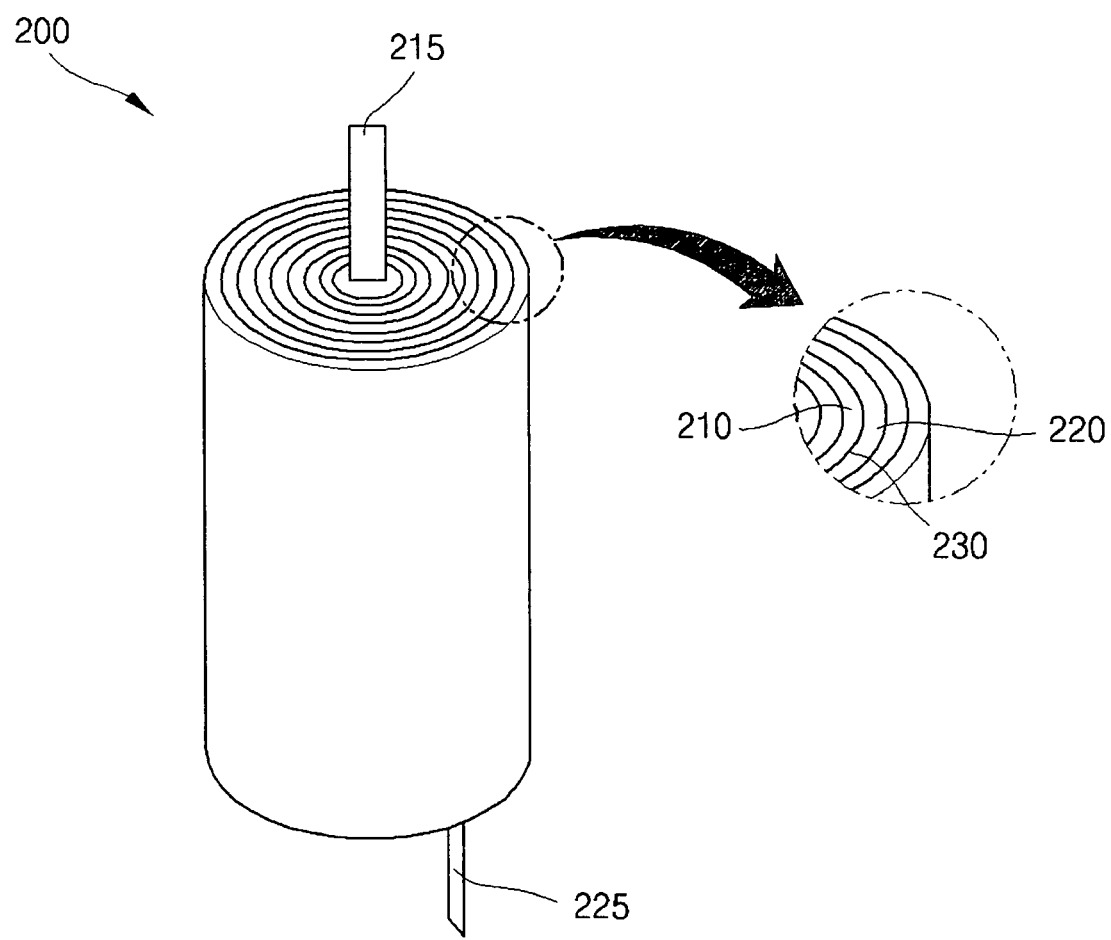
FIG. 3 is a perspective view illustrating an electrode assembly constructed as one exemplary embodiment of the principles of the present invention.

Referring to FIGS. 2 and 3, electrode assembly 200 is prepared by winding a cathode plate 210 in which the surface of a cathode collector is coated with a cathode active material, an anode plate 220 in which the surface of an anode collector is coated with an anode active material, and a separator 230 interposed between cathode plate 210 and anode plate 220 for an electrical insulation between cathode plate 210 and anode plate 220, into a jelly-roll type.

Figure 4:
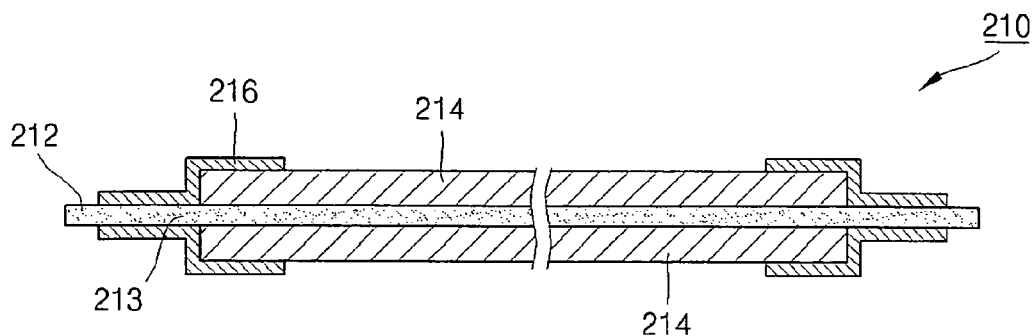
FIG. 4 is a cross-sectional view of a cathode plate constructed as one exemplary embodiment of the principles of the present invention.
Figure 5:
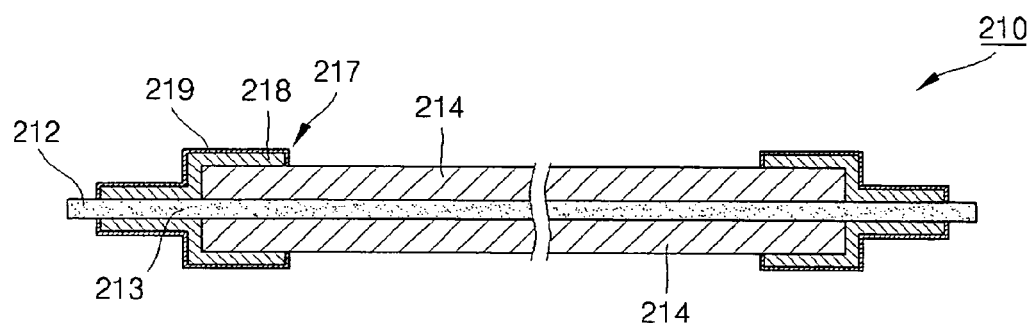
FIG. 5 is a cross-sectional view of a cathode plate constructed as another exemplary embodiment of the principles of the present invention.

FIG. 4 is a cross-sectional view of a cathode plate in which a protection layer is made from a material with an affinity for the electrolyte solution, and FIG. 5 is a cross-sectional view of a cathode plate in which a protection layer is formed by coating the surface of the protection layer with a material with an affinity for the electrolyte solution.

Referring to FIGS. 4 and 5, cathode plate 210 is constructed with a cathode collector 212 made from a thin metal sheet with excellent electrical conductivity, such as aluminum (Al) foil, and a cathode active material layer 214 coating both surfaces of cathode collector 212. Lithium oxide, such as $LiCoO_2$, $LiMn_2O_4$, $LiNiO_2$, $LiMnO_2$ and others, is used as the cathode active material. A cathode collector region without cathode active material layer 214, that is, a uncoated cathode portion 213 is formed at both ends of cathode plate 210. One end of uncoated cathode portion 213 is made from aluminum (Al) and attached with a cathode tab 215 extending to a certain height upwardly from electrode assembly 200.

Protection layers 216 and 217 are formed at an adjoining portion between cathode active material layer 214 and uncoated cathode portion 213 of cathode plate 210. In FIGS. 4 and 5, cathode plate 210 constructed with a protection layer is illustrated for convenience, however, a protection layer may be also formed in an adjoining portion between an anode active material layer and anode uncoated portion of anode plate 220.

In detail, if there is no protection layer, the active material adhering to the electrode collector is easily eliminated, peeled-off or removed from the electrode collector at the adjoining portion between the electrode active material layer and electrode uncoated portion of the electrode plate, that is, either the cathode plate or the anode plate. Therefore, there is a risk of internal short-circuiting. In order to prevent such internal short-circuiting, a protection layer, such as a laminating tape, is formed. An existing laminating film used as the protection layer can be made from any material selectively allowing lithium ion to pass through without chemically reacted with the electrolyte solution. Contemporarily, polyolefin based resin, such as polyethylene (PE), polypropylene (PP) or others, which is used for the separator, is also used for the laminating film.

Low density polyethylene (PE) features a light weight, a good ductility due to the untangled arrangement of molecules, and a high level of impact resistance, but a low tensile strength. Accordingly, polyethylene is easily processed and used. Further, since polyethylene has formula $(CH_2)n$ in which hydrogen atoms are arranged symmetrically around the carbon chain constructed with carbon-carbon double bond, it has an excellent electrical insulating property and is useful as a high-frequency insulating material. Polypropylene (PP) has an isotactic structure in which methyl groups are oriented in the same direction. Polypropylene with a high crystallinity shows a decrease in the crystallinity after molding.

Such polyethylene (PE) and polypropylene (PP) have, however, a low affinity with a non-aqueous electrolyte solution, because there is a great difference in the surface energy between the molecules of the non-aqueous electrolyte solution and the molecules present on the surface of the material of PE or PP, and mutual molecule binding, therefore, becomes difficult. Accordingly, when the electrolyte solution is stuck onto a protection layer made from polyethylene (PE) or polypropylene (PP), the electrolyte solution becomes clustered into a spherical shape by surface tension, and therefore a wettability and a dispersibility of the electrolyte solution on the protection layer, are decreased remarkably.

According to the present invention, the protection layer formed on the adjoining portion between the electrode active material layer and electrode uncoated portion of the electrode plate is made from a material with an affinity for the electrolyte solution. Referring to the embodiment of FIGS. 4 and 5, the impregnation of the electrolyte solution, i.e., the dispersibility of the electrolyte solution, is improved either by modifying the material of an existing laminating tape into a material with an affinity for the electrolyte solution or by coating the surface of the existing laminating tape with the material with an affinity for the electrolyte solution.

In other words, as shown in FIG. 4, the whole protection layer 216 may be made from a material with an affinity for the electrolyte solution. Herein, protection layer 216 may be a laminating tape which is made from a material with an affinity for the electrolyte solution, and which is attached to the adjoining portion between cathode active material layer 214 and uncoated cathode portion 213. Alternatively, protection layer 216 may be formed by coating the adjoining portion between cathode active material layer 214 and uncoated cathode portion 213 with a coating layer made from a material with an affinity for the electrolyte solution.

Further, as shown in FIG. 5, a protection layer 217 may be constructed with a laminating tape 218 and a coating film 219 coating the surface of laminating tape 218. In other words, laminating tape 218 is attached to the adjoining portion between cathode active material layer 214 and uncoated cathode portion 213, and coating film 219 made from a material with an affinity for the electrolyte solution, is coated onto the surface of laminating tape 218 to form a film.

The material with an affinity for the electrolyte solution maybe polyvinylidene fluoride (hereinafter, referred to as PVdF) among polymers. PVdF with formula $(-CH_2-CF_2-)n$ is a kind of fluorine (F) resins used as a binder when coating an electrode collector with electrode active materials. The fluorine (F) resin has a main chain constructed with carbon-carbon single bond similar to the carbon-carbon single bond in polyolefin. The synthetic fluorine resin, however, has a structure in which a part or the whole of hydrogen atoms of polyolefin are replaced by fluorine atoms.

According to test results of the impregnation of the electrolyte solution, among PVdFs, PVdF 761 and PVdF 2801 show good wettability and dispersibility especially when contacting with a non-aqueous electrolyte solution. Accordingly, it is desirable to use one of PVdF 761, PVdF 2801 or a mixture thereof as a protection layer or a coating material for a protection layer.

In order to improve the wettability and dispersibility of the electrolyte solution, either PVdF or a polymer containing hydrophilic group, such as ester group, hydroxy group, or carboxylic group, may be used as a material for protection layer 216.

Ester group is represented by RCOOR' and forms an aliphatic compound, and an ester is a compound produced by inducing a chemical reaction between alcohol or phenol and an organic or inorganic solvent to loose water ($H_2O$), followed by condensation. Carboxylic group is represented by RCOOH and forms an aliphatic compound. Carboxylic acid (i.e., carboxylic group) includes acetic acid ($CH_3COOH$), benzoic acid ($C_6H_5COOH$), and others. Hydroxy group is represented by ROH. Phenol ($C_6H_5OH$) is produced by replacing one hydrogen atom of benzene by a hydroxy group.

Since the polymer containing the above ester group, carboxylic group or hydroxy group has an affinity for the electrolyte solution, if the polymer containing ester group or the others is used as a material for the protection layer, the wettability and dispersibility of the electrolyte solution are improved. Accordingly, the impregnation of the electrolyte solution is also improved.

In this case, however, swelling should not occur in the protection layer. Swelling means that a solid material swells due to gases generated inside the solid material. Particularly, some elements of the solid material, which is radiation-treated in a reactor, are changed into gas elements by nuclear reaction, and the gas elements gather together to form bubbles, so that the material swells. Such gas elements include xenon (Xe) and krypton (Kr) generated from the nuclear fission of uranium (U) and compounds thereof, helium (He) generated from the reaction between beryllium (Be) and neutron, and hydrogen (H) generated from the reaction between ferronickel and neutron or particle. In order to prevent swelling, elements easily binding to such gas elements are added to the protective layer to prevent the gas elements from gathering together, or other elements forming a different phase and being finely dispersed are added the protective layer, so that the interpositioned phase provides a bubble generation point or collects bubbles.

If a polymer containing one of ester group, carboxylic group and hydroxy group absorbs the non-aqueous electrolyte solution and swelling occurs due to overcharge and other, the protection layer swells and causes the modification of the electrode assembly. Accordingly, when using the polymer with an affinity for the electrolyte solution as a material of the protection layer, it is required to adopt a method for preventing swelling or use a swelling-free material. Further, when the protection layer is formed by applying a coating film to the surface of the laminating tape, it is necessary to form the coating film with a thin thickness.

The material with an affinity for the electrolyte solution used in the protection layer may be a surfactant.

The surfactant has both hydrophilic group and oleophilic group at the same time, and thus decreases a surface tension of water and shows various properties of penetration, dispersion, emulsification, foam and others when mixed with other substances. Particularly, the surfactant ensures better penetration of water into a laundry and is well-mixed with oil or grease attached to the fiber so as to remove dirt form the laundry. The surfactant is classified into anionic surfactant, cationic surfactant, nonionic surfactant and amphiphilic surfactant; and the anion surfactant is mainly used in the synthetic detergent.

When dissolving the surfactant in water, an oleophilic portion of the surfactant dissociates into an anion to have negative electric charge (−) in the anionic surfactant, while dissociating into a cation to have positive electric charge (+) in the cationic surfactant. Further, in case of the amphiphilic surfactant, the oleophilic portion dissociates into an ion to have either negative electric charge (−) or positive electric charge (+) according to the hydrogen ion concentration, while ion-dissociation does not occur in the nonionic surfactant.

BRIJ® is a kind of nonionic surfactants without any atom group dissociating into an ion in an aqueous solution, and has —OH group. BRIJ® has relatively low hydrophilic property but excellent oleophilic property due to ester and ether bonds in the molecule, however, the kind of surfactants is not limited thereto.

When the surfactant is mixed with the non-aqueous electrolyte solution, a hydrophilic group at one end of the molecule of the surfactant binds to the surface of the molecule of the non-aqueous electrolyte solution. Accordingly, the contact area of the interface between the surfactant and the non-aqueous electrolyte solution is increased, and the surface tension of the electrolyte solution is thus decreased. As a result, the wettability and dispersibility of the electrolyte solution are improved.

Additionally, when coating the surface of the laminating tape, that is, a material of the protection layer, with either the polymer with an affinity for the electrolyte solution or the surfactant, the surface of the laminating tape is not exclusive to the electrolyte solution, and sedimentation and impregnation rates of the electrolyte solution will be, therefore, increased. The coating layer having a thickness within 1 μm shows enough surface modification effect and also, an approximate monolayer ensures enough surface modification effect.

Figure 6:
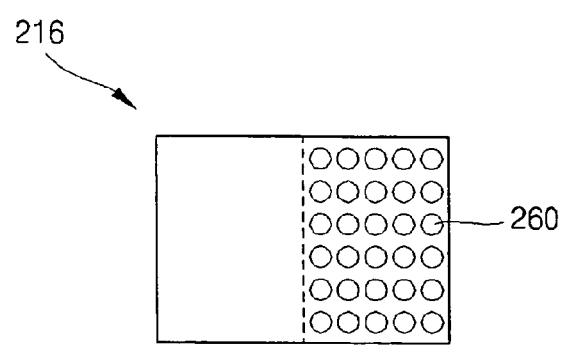
FIG. 6 is a plane view illustrating a protection layer according to one exemplary embodiment of the principles of the present invention.
Figure 7:
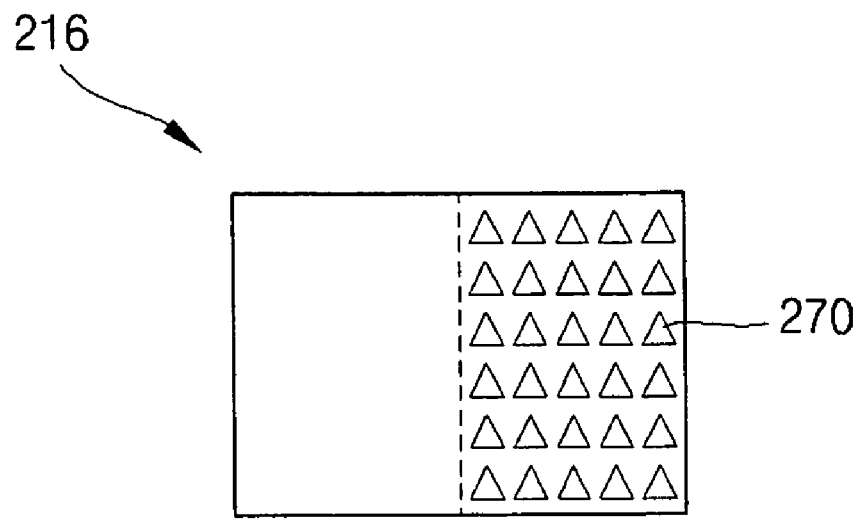
FIG. 7 is a plane view illustrating a protection layer according to another exemplary embodiment of the principles of the present invention.
Figure 8:
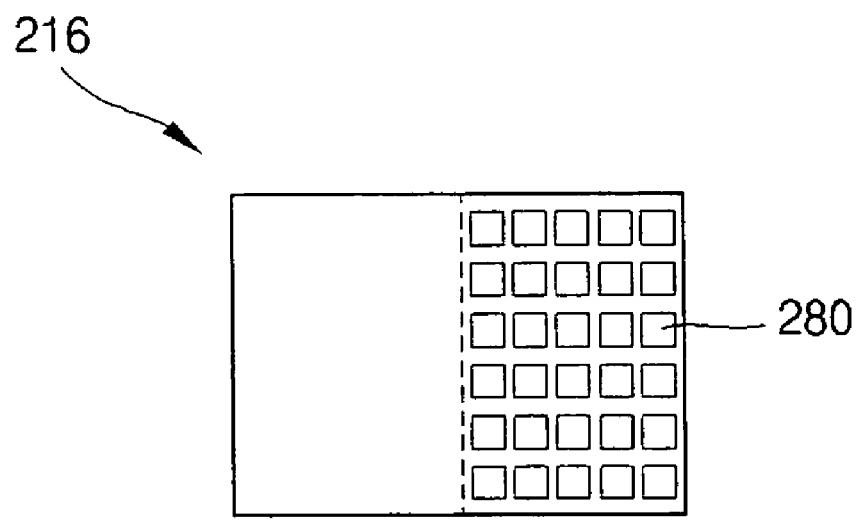
FIG. 8 is a plane view illustrating a protection layer according to the other exemplary embodiment of the principles of the present invention.

Further, the protection layer may have a plurality of holes. FIGS. 6, 7 and 8 are plane drawings of protection layer 216 having a plurality of holes 260, 270 and 280, respectively. Holes 260, 270 and 280 may be formed into one shape selected from circle, triangle and square. The hole-shape is, however, not limited thereto. Since the protection layer partially covers cathode active material layer 214, the surface contact area between the electrolyte solution and cathode active material layer 214 is thus decreased. Therefore, holes 260, 270 and 280 are formed in order to increase the surface contact area between the electrolyte solution and cathode active material layer 214.

It is desirable that holes 260, 270 and 280 are formed on the portion of protection layer 216 to be attached to cathode active material layer 214. The holes formed on the portion in protection layer 216 to be attached to uncoated cathode portion 213 weakens the adhesion of protection layer 216 rather than performing a separate function, i.e., the function of increasing the surface contact area. Referring to FIGS. 6, 7 and 8, the dotted line as illustrated in protection layer 216 shows the adjoining portion between uncoated cathode portion 213 and cathode active material layer 214. Accordingly, the left side without holes 260, 270, 280 covers uncoated cathode portion 213, while the right side with holes 260, 270, 280 covers cathode active material layer 214.

The protection layer may have insulation property.

Anode plate 220 may be constructed with an anode collector made from a thin conductive metal sheet, such as copper (Cu) or nickel (Ni) foil, and an anode active material layer coated on both surfaces of anode plate 220. An anode collector region without an anode active material layer, that is, an anode uncoated portion is formed at both ends of anode plate 220. One end of the anode uncoated portion is generally made from a nickel (Ni) material and attached with an anode tab 225 protruded in a certain height downwardly from electrode assembly 200. In addition, insulation plates 241 and 245 may be further formed respectively on the top and bottom of electrode assembly 200 in order to prevent cap assembly 400 or cylinder-shaped can 300 from being contacted with electrode assembly 200.

Cylinder-shaped can 300, referring to FIG. 2, is further constructed with a cylinder-shaped side plate 310 with a certain diameter enough to accommodate cylinder-shaped electrode assembly 200 and a bottom plate 320 for sealing the bottom of cylinder-shaped side plate 310, in which the top of cylinder-shaped side plate 310 has an opening through which electrode assembly 200 is inserted. Anode tab 225 of electrode assembly 200 is attached to the center of bottom plate 320 of cylinder-shaped can 300 so that cylinder-shaped can 300 plays the role of an anode. Further, cylinder-shaped can 300 is generally made from aluminum (Al), iron (Fe) or an alloy thereof. Additionally, cylinder-shaped can 300 includes a crimping portion 330 bent inwardly from the top end of cylinder-shaped can 300 in order to pressurize the top of cap assembly 400 to be attached to the opening of cylinder-shaped can 300. Further, cylinder-shaped can 300 includes a beading portion 340 recessed inwardly, at the position apart from the bottom of clamping portion 330 by a distance corresponding to the thickness of cap assembly 400, in order to pressurize the bottom of cap assembly 400.

Cap assembly 400, referring to FIG. 2, is constructed with a safety vent 410, a current breaker 420, a secondary protection circuit 480 and a cap up 490. Safety vent 410 is formed into a plate shape and is constructed with a protrusion portion to be protruded downwardly from the middle of safety vent 410. Safety vent 410 is placed at the bottom of cap assembly 400, and the protrusion portion is turned upwardly by the pressure generated inside secondary battery 100. An electrode tab led outwardly from one electrode plate among cathode plate 210 and anode plate 220 of electrode assembly 200 is welded to a certain position of the bottom of safety vent 410. For instance, a cathode tab 215 of cathode plate 210 is welded to the bottom of safety vent 410, so that safety vent 410 and cathode plate 210 of electrode assembly 200 are electrically connected with each other. Herein, the other electrode plate among cathode plate 210 and anode plate 220, for instance, anode plate 220 is electrically connected with can 300 either through anode tab 225 or by direct connection method.

As described above, the lithium secondary battery, according to the present invention, produces the following effect.

First, the secondary battery improves wettability and dispersibility against the electrolyte solution by modifying the material of a protection layer into a material with an affinity for the electrolyte solution, or by coating the surface of an existing protection layer with a material with an affinity for the electrolyte solution.

Second, in addition to improving the wettability and dispersibility, the electrolyte solution is more highly impregnated into a portion with high pressure than other portions in the electrode assembly formed into a jelly-roll type.

Third, in addition to improving the impregnation of the electrolyte solution, the impregnation time is decreased, so that production yields are increased.

The present invention is not limited to a certain desirable embodiment as described above. It should be understood by those of ordinary skill in the art that various replacements, modifications and changes in the form and details maybe made therein without departing from the spirit and scope of the present invention as defined by the following claims. Therefore, it is to be appreciated that the above described embodiments are for purposes of illustration only and are not to be construed as limitations of the invention.

What is claimed is:

1. A lithium secondary battery, comprising:
    an electrode assembly, comprising:
        a cathode plate having a cathode active material portion in which a cathode collector is coated with a cathode active material and an uncoated cathode portion composed only of the cathode collector;
        an anode plate having an anode active material portion in which an anode collector is coated with an anode active material and an anode uncoated portion composed only of the anode collector;
        a protection layer formed on an adjoining portion between an active material portion and an uncoated portion of a terminal end of one selected from the group consisting of one of the cathode plate, the anode plate and both of the cathode plate and the anode plate; and
        a separator interposed between the cathode plate and the anode plate;
    a case open to receive the electrode assembly and an electrolyte solution; and
    a cap assembly oriented to seal an upper opening of the case, with the protection layer comprised of a material having an affinity for the electrolyte solution due to the wettability and dispersibility of the material for the protection layer against an electrolyte solution.

2. The lithium secondary battery of claim 1, with the material for the protection layer having an affinity for the electrolyte solution being a polymer.

3. The lithium secondary battery of claim 2, with the polymer being polyvinylidene fluoride (PVdF).

4. The lithium secondary battery of claim 2, with the polymer containing one of ester group, hydroxy group or carboxylic group.

5. The lithium secondary battery of claim 1, with the protection layer having a plurality of holes.

6. The lithium secondary battery of claim 5, with the holes being formed into one shape selected from circle, triangle and square.

7. The lithium secondary battery of claim 1, with the protection layer having insulation property.

8. The lithium secondary battery of claim 1, with the protection layer comprising a laminating tape to be attached to the adjoining portion between the active material portion and the uncoated portion of the terminal end of said one of the cathode plate or the anode plate or both the cathode plate and the anode plate.

9. The lithium secondary battery of claim 1, with the protection layer being a coating layer to be applied to the adjoining portion between the active material portion and the uncoated portion of the terminal end of said one of the cathode plate or the anode plate or both the cathode plate and the anode plate.

10. The lithium secondary battery of claim 1, with the material for the protection layer having an affinity for the electrolyte solution being a surfactant.

11. The lithium secondary battery of claim 10, with the surfactant being a non-ionic surfactant.

12. The lithium secondary battery of claim 1, with the protection layer further comprising an element forming a different phase in order to collect bubbles.

13. The lithium secondary battery of claim 12, with the element forming the different phase being finely dispersed within the protection layer.

14. A lithium secondary battery, comprising:
    an electrode assembly, comprising:
        a cathode plate having a cathode active material portion in which a cathode collector is coated with a cathode active material and an uncoated cathode portion composed only of the cathode collector;
        an anode plate having an anode active material portion in which an anode collector is coated with an anode active material and an anode uncoated portion composed only of the anode collector;
        a protection layer that is formed on an adjoining portion between an active material portion and an uncoated portion of a terminal end of one of the cathode plate or the anode plate; and
        a separator that is interposed between the cathode and anode plates;
    a case for receiving the electrode assembly and an electrolyte solution; and
    a cap assembly for sealing an upper opening of the case, with the protection layer comprising a laminating tape to be attached to the adjoining portion between the active material portion and the uncoated portion of the terminal end of said one of the cathode plate or the anode plate, and a coating film that is a material having an affinity for the electrolyte solution due to the wettability and dispersibility of the material against an electrolyte solution and that is applied to the surface of the laminating tape.

15. The lithium secondary battery of claim 14, with the thickness of the coating film is less than approximately 1 µm.

* * * * *